(12) United States Patent
Zhou et al.

(10) Patent No.: US 9,009,166 B2
(45) Date of Patent: Apr. 14, 2015

(54) METHOD AND SYSTEM FOR SOCIAL CREDIT SCORING

(76) Inventors: Dylan T X Zhou, San Gabriel, CA (US);
Tiger T G Zhou, Tiburon, CA (US);
Andrew H B Zhou, Tiburon, CA (US)

( * ) Notice: Subject to any disclaimer, the term of this patent is extended or adjusted under 35 U.S.C. 154(b) by 16 days.

(21) Appl. No.: 13/475,952

(22) Filed: May 19, 2012

(65) Prior Publication Data
US 2013/0311484 A1    Nov. 21, 2013

(51) Int. Cl.
*G06F 17/30*    (2006.01)

(52) U.S. Cl.
CPC .................. *G06F 17/30864* (2013.01)

(58) Field of Classification Search
CPC .............................................. G06F 17/30864
USPC .......... 707/748, 749, 784; 709/203, 217, 218, 709/219
See application file for complete search history.

(56) References Cited

U.S. PATENT DOCUMENTS

| | | | |
|---|---|---|---|
| 8,131,745 B1 * | 3/2012 | Hoffman et al. ............ | 707/766 |
| 2011/0137789 A1 * | 6/2011 | Kortina et al. ............... | 705/38 |
| 2011/0320341 A1 * | 12/2011 | Kremen ....................... | 705/38 |

OTHER PUBLICATIONS

Nolker et al., Social Computing and Weighting to Identify Member Roles in Online Communities, 2005, IEEE, 1-7.*
Mingfeng Lin et al., Social Networks as Signaling Mechanisms: Evidence from Online Peer-to-Peer Lending, Oct. 2009, Google Scholar, 1-32.*

* cited by examiner

*Primary Examiner* — Jean B Fleurantin
(74) *Attorney, Agent, or Firm* — Patent Jurist; Georgiy L. Khayet

(57) ABSTRACT

A method for calculating a social credit score based on online activity of a user is provided. Online activity may be monitored and processed to calculate an indicant of user activity and its influence on other users to obtain a social credit score of the user. Social credit scores may be used to stimulate users to be more active in their online socializing, share their content, and provide information. Social credit scores may be a source of information for advertisers, employers, bankers, and others. Information on social credit scores may be analyzed to determine users with high scores to distinguish top score users and mark them with special prizes, titles, or symbols. Additionally, a list of top scorers may be published via a social networking engine or otherwise as an additional factor of stimulation for other users.

16 Claims, 4 Drawing Sheets

METHOD AND SYSTEM FOR SOCIAL CREDIT SCORING

FIELD

This application relates generally to internet-based communications and, more specifically, to methods and systems for evaluating online activity of users and scoring social credits of users.

BACKGROUND

With the development and widespread of the Internet, many new forms of communication and self-expression came to existence. A few examples include internet forums, social networks, social blogs, and so forth. Users of web resources and social media share their content, identify interests, and provide their information. Online activity and spheres of interests of users as well as influence of user online activity on other users can be monitored and measured to determine their online influence or a social credit score. Some services perform social credit score measuring, however, these services take into account mainly textual activity and ignore other areas of online activity. Therefore, there is a need for a comprehensive social credit score that will include all areas of online activity and provide a more reliable and justified scoring.

SUMMARY

Provided are methods and systems for social credit scoring based on online activity of a user. In general, these methods and systems are designed to stimulate users to share their content and provide information to create a more attractive and entertaining environment for users of a social networking service.

In certain embodiments, a method for social credit scoring based on online activity of a user involves collecting data on online activity of a user and data on response of other users to the online activity of the user. The collected activity and response data may be used to calculate an indicant of a social credit score of the user based on various algorithms. This social credit score may be immediately tallied and published on a web page associated with the user.

In certain embodiments, the social credit score of the user may be published in a social network or any other web page associated with the user, included in top score lists, used to provide special prizes, marks, ranks, symbols, or other distinguishing signs, or provided to interested parties.

Also provided is a system for social credit scoring based on online activity of a user. The system may include a data collecting module to collect activity and response data related to the online activity of a user, a calculating module to calculate, based on the activity and response data, a social credit score of the user, and an instant tally module to tally a social credit score to the user.

In certain embodiments, the system may also include a communication module to exchange information with the user, an analyzing module to analyze the social credit score of users to determine the users with a high social credit score, and a marking module to mark the users with the high social credit score with special prizes, marks, ranks, symbols, or other distinguishing signs. Additionally, the system may include a publishing module to publishing a social score of the user in a social network or any other web page associated with the user, and in a list of the top high score users.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Systems and methods described herein may allow a social network engine operator to provide social credit scoring functionality within various services, such as social networking website, a microblog, a webmail, a blog, a mobile short message.

In one example embodiment, a system for social credit scoring based on online activity of a user may include or be coupled to a social networking engine. Online activity of a user within a social network may be monitored, together with the response of other users to the online activity of the user. The data of monitoring and data on user contacts, friends, and connections may be processed using various algorithms in order to obtain an indicant of influence of the user and his online activity called a social credit score. The purpose of a social credit score may be to stimulate users to share their content and provide information to create a more attractive and entertaining environment for users of a social networking service. The social credit score may be immediately tallied after each operation related to the online activity of the user based on numeric values assigned to each specific type of the online activity.

In some embodiments, social credit scores of users may be analyzed to identify users with high scores. The purpose of this may be to identify influential users in social networking and use these data for advertising, stimulating other users of a social networking service to share their content and information, providing access to these data for interested parties.

In certain embodiments, the social credit score of a user may be published in a social network or any other web page associated with the user, included in top score lists, used to provide special prizes, marks, ranks, symbols, or other distinguishing signs. Additionally, it may be provided to interested parties. These operations may be performed based on user settings or irrespective of them.

Figure 1:
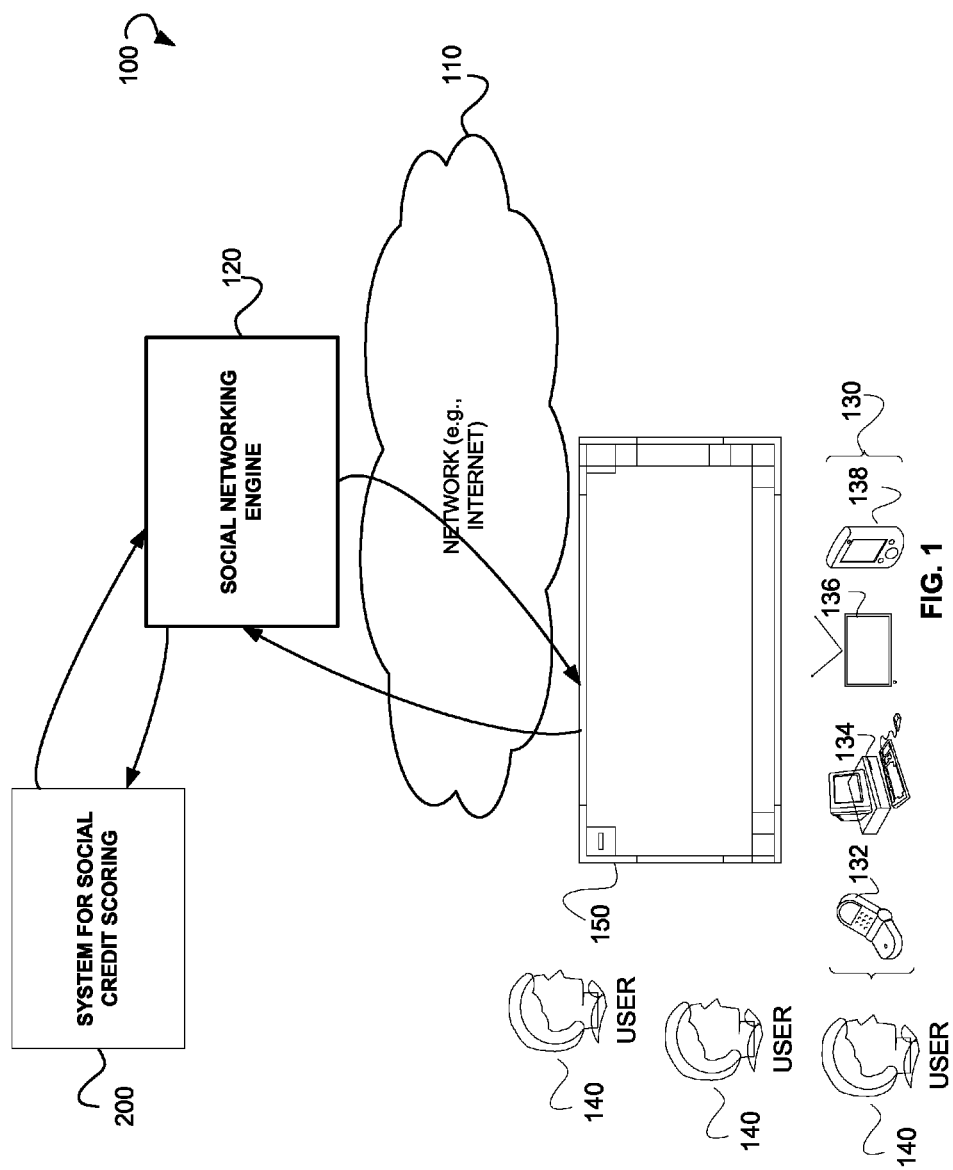
FIG. 1 is a block diagram illustrating an example of the overall system for social credit scoring based on online activity of a user, in accordance with various embodiments.

Referring now to figures, FIG. 1 is a block diagram illustrating an example of the overall system for social credit scoring based on online activity of a user, in accordance with various embodiments. FIG. 1 shows an architecture 100 that may include a network 110, a social networking engine 120, client devices 130, a user 140, a user interface 150, and a system for social credit scoring 200. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 120 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may be a network of data processing nodes that are interconnected for the purpose of data communication.

The client devices 130, in some example embodiments, may include a Graphical User Interface (GUI) for displaying the user interface 150. In a typical GUI, instead of offering only text menus or requiring typed commands, the system presents graphical icons, visual indicators, or special graphical elements called widgets that may be utilized to allow the user 140 to interact with the user interface 150. The client devices 130 may be configured to utilize icons used in conjunction with text, labels, or text navigation to fully represent the information and actions available to users.

The client devices 130 may include a mobile telephone 132, a computer 134, a television (TV) set 136, and a personal digital assistant (PDA) 138. The user 140, in some example embodiments, is a person interacting with the user interface 150 via the client devices 130. The user 140 may be a member of a social network provided by the social networking engine 120. The user 140 may periodically interact with the social networking engine 120 and provide various information to the social networking engine 120. This information is stored and, in certain embodiments, analyzed by the social networking engine 120 to create user specific information, such as user's profile. This information may include various demographic information about the user 140 (e.g., age, gender, location), user's interests and spheres of activity, user's connections in the social network (e.g., friends) and other types of information. The user 140 information and communications with the social networking engine 120 may be monitored by the system for social credit scoring 200.

Figure 2:
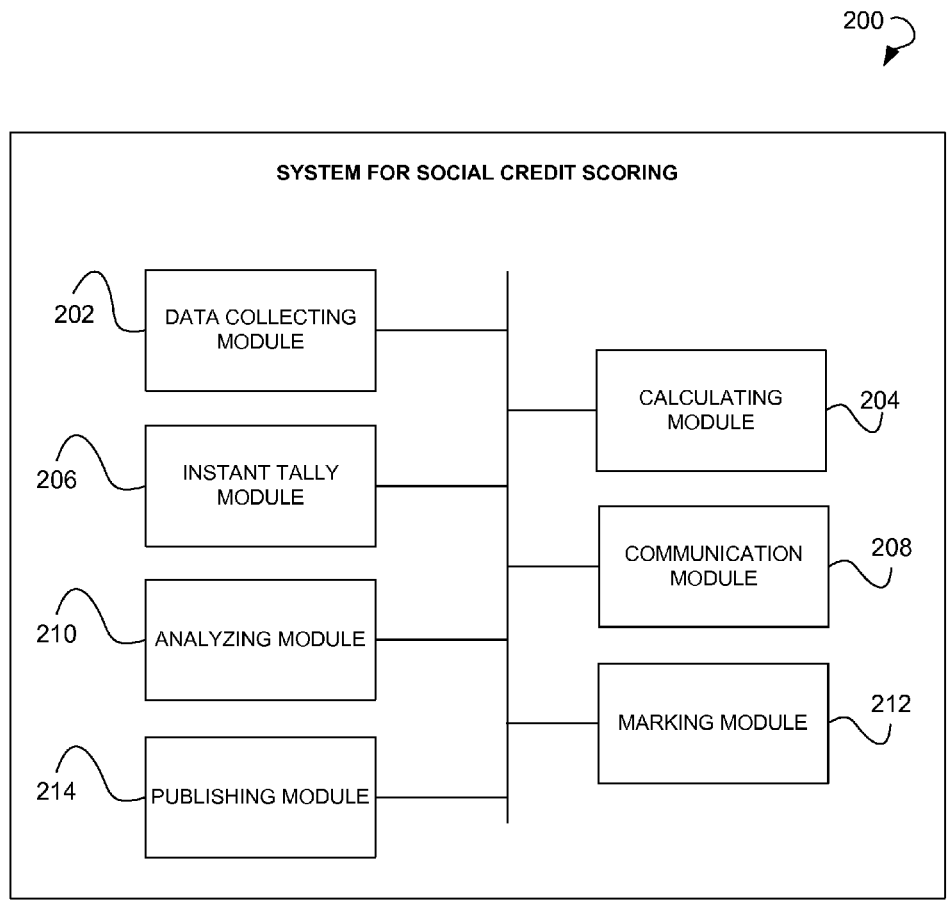
FIG. 2 is a block diagram showing various modules of the computer system for social credit scoring based on online activity of a user, in accordance with certain embodiments.

FIG. 2 illustrates a detailed block diagram of the system for social credit scoring 200 based on online activity of a user, in accordance with an example embodiment. The system for social credit scoring 200 may include a data collecting module 202, a calculating module 204, an instant tally module 206, a communication module 208, an analyzing module 210, a marking module 212, and a publishing module 214.

Note that even though various modules of the system for social credit scoring 200 are shown together, the system for social credit scoring 200 may be implemented as a web service, via a distributed architecture, or within a cloud computing environment.

The data collecting module 202 of the system for social credit scoring 200 may be configured to collect activity data on the online activity of a user, and response data on response of other users to the online activity of the user. The activity data may include data related to a number of the user contacts, friends, or connections, and to a number, frequency, volume of messages, texts, recommendations, ideas, creations, reviews, comments, articles, photo materials, video materials, games, drawings, links, answers, payments, buying and selling records published, edited, shared, or reposted by the user. The response data may include data related to views, answers, comments, reposting, following links, purchases, and other types of response of other users to the online activity of the user.

The calculating module 204 may be configured to calculate, based on the activity data and the response data, a social credit score of the user. The collected activity and response data may be used to calculate a number, index, percentage, rating, or another indicant of a social credit score of the user based on various algorithms. In some embodiments, a social credit score of the user may be calculated for specific thematic or geographical areas, for specific activity types, for specific user groups, and so forth.

This calculated social credit score may be immediately tallied for the user 140, via the user interface 150 or otherwise, using the instant tally module 206 of the system for social credit scoring 200.

The communication module 208 may be configured to exchange information with the user. For example, the system, via the communication module 208, may inform the user about changes related to the social credit score of the user, prizes or benefits available for the user, new rules for social credit score calculation, and so forth. Additionally, the communication module 208 may receive user responses to system messages and proposals.

The analyzing module 210 may be configured to analyze the social credit score of users to determine the users with a high social credit score. Analysis may be performed separately for specific thematic or geographical areas, activity types, user groups, and so forth. The marking module 212 may mark users with a high social credit score with special prizes, marks, ranks, symbols, or other distinguishing signs. Prizes may be provided by third parties.

Analysis results obtained by the analyzing module 210 may be also published, by the publishing module 214, in a social network or any other web site. Additionally, the publishing module 214 may publish the social credit score of the user in a web page associated with the user.

Figure 3:
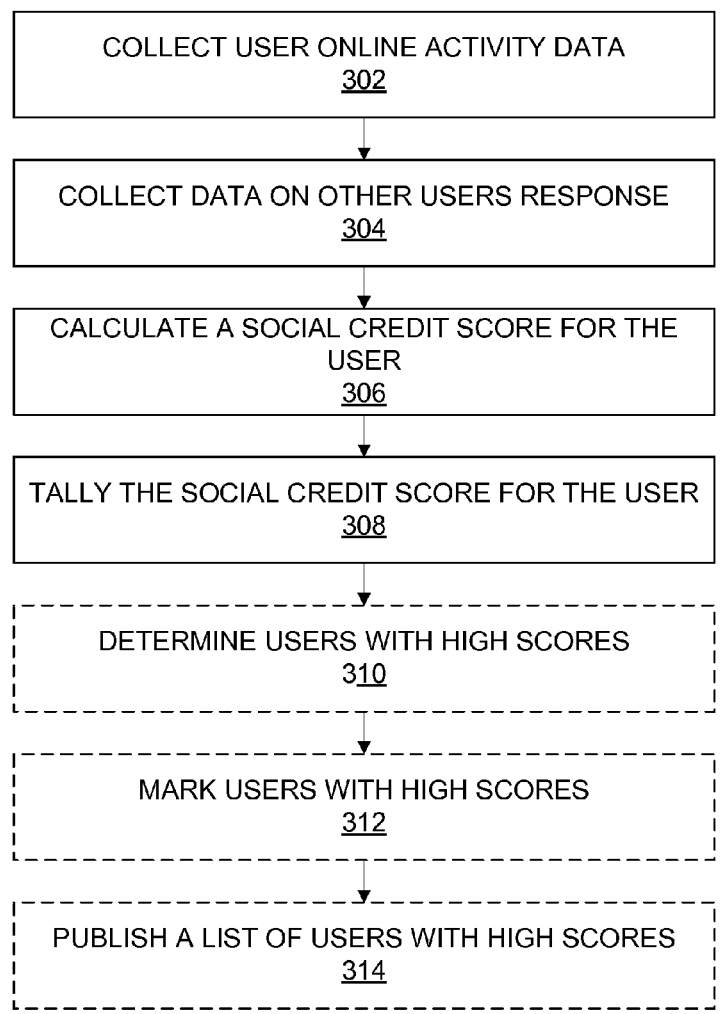
FIG. 3 is a flow chart illustrating a method for social credit scoring based on online activity of a user, in accordance with certain embodiments.

FIG. 3 shows a flow chart 300 of a method for social credit scoring based on online activity of a user, in accordance with an example embodiment. The method 300 may be performed by processing logic that may comprise hardware (e.g., dedicated logic, programmable logic, microcode, etc.), software (such as computer code executable on a general-purpose computer system or a specifically configured computer system), or a combination of both. In one example embodiment, the processing logic resides at the system for social credit scoring 200, illustrated in FIG. 2. The method 300 may be performed by the various modules discussed above with reference to FIG. 2. Each of these modules may comprise processing logic.

As shown in FIG. 3, the method 300 may commence at operation 302, with the data collecting module 202 collecting, via a social networking engine 120 or otherwise, data related to online activity of the user 140, and, at operation 304, data related to response of one or more other users 140 to online activity of the user 140. This data will be used by system for social credit scoring 200 to calculate an indicant of influence of the user and his online activity, called a social credit score, at operation 306.

At operation 308, a social credit score of the user 140 may be tallied for the user 140 via the user interface 150 or otherwise.

At operation 310, the analyzing module 210 may determine users with high scores based on social credit scores calculated for each user. Then, at operation 312, the marking module 212 may mark top high score users with distinguishing marks, for example, they may get a special title, a graphical symbol, and so forth. Additionally, top high score users may be provided with special prizes or benefits proposed via the system for social credit scoring or third parties.

At operation 314, a list of top high score users may be published via the user interface 150, via the social networking engine, or otherwise.

Figure 4:
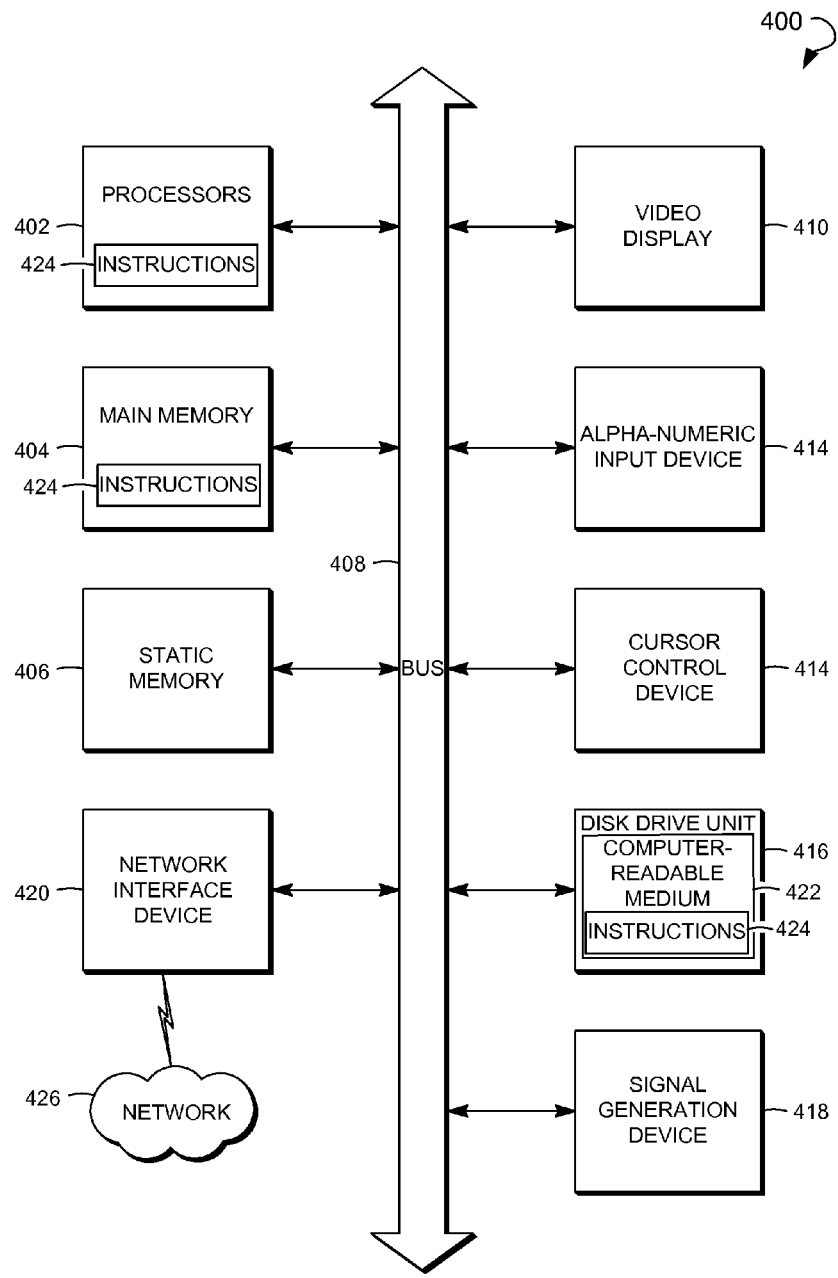
FIG. 4 illustrates an example of a computer system, in which various embodiments may be implemented.

FIG. 4 shows a diagrammatic representation of a machine in the example electronic form of a computer system 400, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor or multiple processors 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 may also include an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a computer-readable medium 422, on which is stored one or more sets of instructions and data structures (e.g., instructions 424) embodying or utilized by any one or more of the methodologies or functions described herein. The instructions 424 may also reside, completely or at least partially, within the main memory 404 and/or within the processors 402 during execution thereof by the computer system 400. The main memory 404 and the processors 402 may also constitute machine-readable media.

The instructions 424 may further be transmitted or received over a network 426 via the network interface device 420 utilizing any one of a number of well-known transfer protocols (e.g., Hyper Text Transfer Protocol (HTTP)).

While the computer-readable medium 422 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, a system and method for social credit scoring based on online activity of a user have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for calculating a social credit score of a user, the method comprising:
    collecting, by a processor, activity data, the activity data being related to at least one of a number, a frequency and a volume of information posted online by the user, wherein a specific numeric value is assigned to each of the number, the frequency and the volume of information posted online by the user;
    collecting, by the processor, response data, the response data being related to online postings of one or more other users in response to the information posted online by the user;
    determining, by the processor, based on the activity data and the response data, the social credit score of the user, wherein the determining the social credit score includes adding the specific numeric value associated with at least one of the number, the frequency and the volume of information posted online by the user to the social credit score of the user;
    immediately tallying, by the processor, the social credit score of the user;

publishing the social credit score in a web page associated with the user such that the social credit score is made available to at least one other party;

determining, by the processor, whether the social credit score of the user constitutes a high social credit score relative to social credit scores of the one or more other users;

marking, by the processor, the user with at least one of special prizes, marks, ranks, symbols, and distinguishing signs when the determining determines that the social credit score constitutes the high social credit score;

publishing, by the processor, the social credit score of the user that constitutes the high social credit score in a list of users with high social credit scores to stimulate the one or more other users for online activity.

2. The method of the claim 1, wherein the online activity of the user includes the online activity of the user within a social networking service.

3. The method of the claim 1, wherein the information posted online includes at least one of publishing, editing, sharing, and reposting at least one of messages, texts, recommendations, ideas, creations, reviews, comments, articles, photo materials, video materials, games, drawings, links, answers, payments, buying and selling records.

4. The method of the claim 1, wherein the response online postings of the one or more other users in response to the online postings of the user includes at least one of views, answers, comments, reposting, following links and purchases.

5. The method of the claim 1, further comprising exchanging information with the user.

6. The method of claim 1, wherein the social credit score is calculated for specific areas.

7. The method of claim 1, wherein the publishing the social credit score further includes publishing a list of users with high social credit scores.

8. The method of claim 1, wherein the social credit score is indicative of a level of participation of the user in at least one online social environment.

9. A system for calculating a social credit score of a user, the system comprising:
a processor configured to:
collect activity data, the activity data being data related to at least one of a number, a frequency and a volume of information posted online by the user, wherein a specific numeric value is assigned to each of the nufiber, the frequency and le volume of information posted online by the user;
collect response data, the response data being data related to online postings of one or more other users in response to the information posted online by the user;
determine based on the activity data and the response data, the social credit score of the user, wherein the determining the social credit score includes adding the specific numeric value associated with at least one of the number, the frequency and the volume of information posted online by the user to the social credit score of the user;
immediately tally the social credit score of the user;
publish the social credit score of the user in the web page associated with the user such that the social credit score is made available to at least one other party;
determine whether the social credit score of the user constitutes a high social credit score relative to social credit scores of other users;
mark the user with at least one of special prizes, marks, ranks, symbols, and distinguishing signs when the determining determines that the social credit score constitutes the high social credit score;
publish the social credit score of the user that constitutes the high social credit score in a list of users with high social credit scores to stimulate the one or more other users for online activity.

10. The system of claim 9, wherein the information posted online includes at least one of publishing, editing, sharing, and reposting at least one of messages, texts, recommendations, ideas, creations, reviews, comments, articles, photo materials, video materials, games, drawings, links, answers, payments, buying and selling records.

11. The system of claim 9, wherein the online postings of the one or more other users in response to the online postings of the user includes at least one of views, answers, comments, reposting, following links and purchases.

12. The system of claim 9, wherein the processor is further configured to exchange information with the user.

13. The system of claim 9, wherein the social credit score is available for the user only.

14. The system of claim 9, wherein the social credit score is calculated for specific areas.

15. The system of claim 9, wherein the processor is further configured to publish a list of users with high social credit scores.

16. A non-transitory computer-readable medium comprising instructions, which when executed by one or more processors, perform the following operations:
collecting activity data, the activity data being data related to at least one of a number, a frequency and a volume of information posted online by a user, wherein a specific numeric value is assigned to each of the number, the frequency and the volume of information posted online by the user;
collecting response data, the response data being data related to online postings of one or more other users in response to the information posted online by the user;
determining, based on the activity data and the response data, a social credit score of the user, wherein the determining the social credit score includes adding the specific numeric value associated with at least one of the number, the frequency and the volume of information posted online by the user to the social credit score of the user;
immediately tallying the social credit score of the user;
publishing the social credit score of the user in a web page associated with the user such that the social credit score is made available to at least one other party;
determining whether the social credit score of the user constitutes a high social credit score relative to social credit scores of other users;
marking the user with at least one of special prizes, marks, ranks, symbols, and distinguishing signs when the determining determines that the social credit score constitutes the high social credit score;
publishing the social credit score of the user that constitutes the high social credit score in a list of users with high social credit scores to stimulate the one or more other users for online activity.

* * * * *